(12) United States Patent
Wang et al.

(10) Patent No.: US 9,351,149 B2
(45) Date of Patent: May 24, 2016

(54) EVOLVED MULTIMEDIA BROADCAST MULTICAST SERVICE NETWORK SHARING AND ROAMING SUPPORT

(71) Applicant: QUALCOMM Incorporated, San Diego, CA (US)

(72) Inventors: Jun Wang, Poway, CA (US); Xiaoxia Zhang, San Diego, CA (US); Gordon Kent Walker, Poway, CA (US); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/513,478

(22) Filed: Oct. 14, 2014

(65) Prior Publication Data

US 2015/0119023 A1     Apr. 30, 2015

Related U.S. Application Data

(60) Provisional application No. 61/894,950, filed on Oct. 24, 2013.

(51) Int. Cl.
*H04W 4/00* (2009.01)
*H04W 8/12* (2009.01)
(Continued)

(52) U.S. Cl.
CPC .............. *H04W 8/12* (2013.01); *H04L 12/189* (2013.01); *H04W 4/06* (2013.01); *H04W 72/005* (2013.01); *H04W 12/04* (2013.01)

(58) Field of Classification Search
CPC ....... H04W 8/12; H04W 72/005; H04W 4/06; H04W 12/04; H04L 12/189
USPC ............... 455/432.1, 411, 433; 370/312, 259, 370/235, 328, 331, 332
See application file for complete search history.

(56) References Cited

U.S. PATENT DOCUMENTS

2007/0293249 A1* 12/2007 Wang ........................... 455/466
2008/0287057 A1* 11/2008 Zisimopoulos .............. 455/3.01
(Continued)

FOREIGN PATENT DOCUMENTS

EP    1897384 B1    9/2010
EP    2538735 A2    12/2012

OTHER PUBLICATIONS

Ericsson: "Correction to the OMA Push based MBMS download method", 3GPP TSG RAN WG4, XX, XX, No. S4-070296, Apr. 23, 2007, pp. 1-4, XP002506613.
(Continued)

*Primary Examiner* — Dhaval Patel
(74) *Attorney, Agent, or Firm* — The Marbury Lar Group, PLLC

(57) ABSTRACT

Systems, methods, and devices of the various embodiments enable evolved Multimedia Broadcast Multicast Service ("eMBMS") network sharing, content sharing, and roaming. The various embodiments may enable Multimedia Broadcast Multicast Service ("MBMS") service continuity across different public land mobile networks ("PLMNs") by associating the same MBMS services providing identical content in different PLMNs with each other. In an embodiment, service discovery may be provisioned to a receiver device when or after the receiver device is attached to a PLMN. In an embodiment, content sharing across different PLMNs may be supported by a user service description indicating the different temporary mobile group identifiers ("TMGIs") of the same service across different PLMNs. In another embodiment, content sharing across different PLMNs may be supported by a user service description indicating the same TMGI for the same service across different PLMNs. In an embodiment, MBMS keys may be shared across PLMNs.

26 Claims, 15 Drawing Sheets

(51) Int. Cl.
*H04W 4/06* (2009.01)
*H04L 12/18* (2006.01)
*H04W 72/00* (2009.01)
*H04W 12/04* (2009.01)

(56) References Cited

U.S. PATENT DOCUMENTS

2009/0219848 A1* 9/2009 Lohmar et al. ............... 370/312
2013/0290555 A1* 10/2013 Einarsson et al. ............ 709/231
2014/0036676 A1* 2/2014 Purnadi ............. H04W 36/0055
370/235

OTHER PUBLICATIONS

International Search Report and Written Opinion—PCT/US2014/061210—ISA/EPO—Feb. 9, 2015.
Qualcomm Incorporated: "eMBMS and PLMN Selection", 3GPP Draft; C1-122909 MBMS and PLMN Selection Discusion Paper R1, 3rd Generation Partnership Project (3GPP), Mobile Competence Centre ; 650, Route Des Lucioles ; F-06921 Sophia Antipolis Cedex ; Franc vol. CT WG1, no. Chicago, USA; 20120806-20120810 Jul. 30, 2012, XP050773656, Retrieved from the Internet: URL:http://www.3gpp.org/ftp/tsg_ct/WG1_mm- cc smex-CN1/TSGC1_79$_{13}$ Chicago/docs/.

* cited by examiner

| IPv4 Address | IPv6Address | Port Number | TMGI Service ID |
|---|---|---|---|
| 239.192.0.0 | FF18:0:0:0:0:0:0:0 | 49152 | 0 |
| 239.192.0.0 | FF18:0:0:0:0:0:0:0 | 49153 | 1 |
| 239.192.0.0 | FF18:0:0:0:0:0:0:0 | 49154 | 2 |
| 239.192.0.0 | FF18:0:0:0:0:0:0:0 | 49155 | 3 |
| 239.192.0.0 | FF18:0:0:0:0:0:0:0 | 49156 | 4 |
| 239.192.0.0 | FF18:0:0:0:0:0:0:0 | 49157 | 5 |
| 239.192.0.0 | FF18:0:0:0:0:0:0:0 | 49158 | 6 |
| 239.192.0.0 | FF18:0:0:0:0:0:0:0 | 49159 | 7 |
| 239.192.0.0 | FF18:0:0:0:0:0:0:0 | 49160 | 8 |
| ... | ... | ... | ... |
| 239.192.0.0 | FF18:0:0:0:0:0:0:0 | 49182 | 30 |
| 239.192.0.0 | FF18:0:0:0:0:0:0:0 | 49183 | 31 |

FIG. 11

EVOLVED MULTIMEDIA BROADCAST MULTICAST SERVICE NETWORK SHARING AND ROAMING SUPPORT

CROSS REFERENCE TO RELATED APPLICATIONS

This application claims the benefit of priority to U.S. Provisional Patent Application No. 61/894,950 entitled "Evolved Multimedia Broadcast Multicast Service Network Sharing and Roaming Support" filed Oct. 24, 2013, the entire contents of which are hereby incorporated by reference.

BACKGROUND

In current evolved Multimedia Broadcast Multicast Service ("eMBMS") networks established according to the 3rd Generation Partnership Projects ("3GPP") Technical Standards ("TSs") network broadcast services, (e.g., audio or video streaming), can be provided as broadcast services (e.g., Multimedia Broadcast Multicast Service ("MBMS") services). In the current LTE network sharing architecture (i.e., that defined in 3GPP TS 23.251 Version 11.5.0 Release 11), only unicast is considered, and the eMBMS network sharing requirements have not been fully specified. Furthermore, issues faced when sharing content across networks to avoid duplication of transmission over the air are not currently addressed in the current LTE network architecture. In addition, current eMBMS operations do not fully address eMBMS reception in a roaming network.

SUMMARY

The systems, methods, and devices of the various embodiments enable evolved Multimedia Broadcast Multicast Service ("eMBMS") network sharing, content sharing, and roaming. In the various embodiments, network sharing may enable multiple operators or service providers to share a capacity of a physical network (for example, radio access network). In the various embodiments, roaming may enable receiver devices to receive services when not located in the receiver devices' home networks. The various embodiments may enable Multimedia Broadcast Multicast Service ("MBMS") service continuity across different public land mobile networks ("PLMNs") by associating the same MBMS services providing identical content in different PLMNs with each other. In an embodiment, service discovery may be provisioned to a receiver device when or after the receiver device is attached to a PLMN. In an embodiment, content sharing across different PLMNs may be supported by a user service description indicating the different temporary mobile group identifiers ("TMGIs") of the same service across different PLMNs. In another embodiment, content sharing across different PLMNs may be supported by a user service description indicating the same TMGI for the same service across different PLMNs. In an embodiment, MBMS keys may be shared across PLMNs. In another embodiment, information needed to protect MBMS keys may be sent from a HPLMN to other PLMNs.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 11 illustrates example elements of a reserved temporary mobile group identifier ("TMGI"), address, and port table for shared services.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "receiver device" is used herein to refer to any one or all of cellular telephones, smart phones, personal or mobile multi-media players, personal data assistants ("PDAs"), personal computers, laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for receiving Multimedia Broadcast Multicast Service ("MBMS") services.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein to support local applications.

3GPP TS 23.251 Version 11.5.0 Release 11 ("TS 23.251"), incorporated herein by reference in its entirety, specifies two types of network sharing, a gateway core network ("GWCN") configuration and a multi-operator core network ("MOCN") in which multiple core network ("CN") nodes are connected to the same eNode-B ("eNB").

Figure 1:
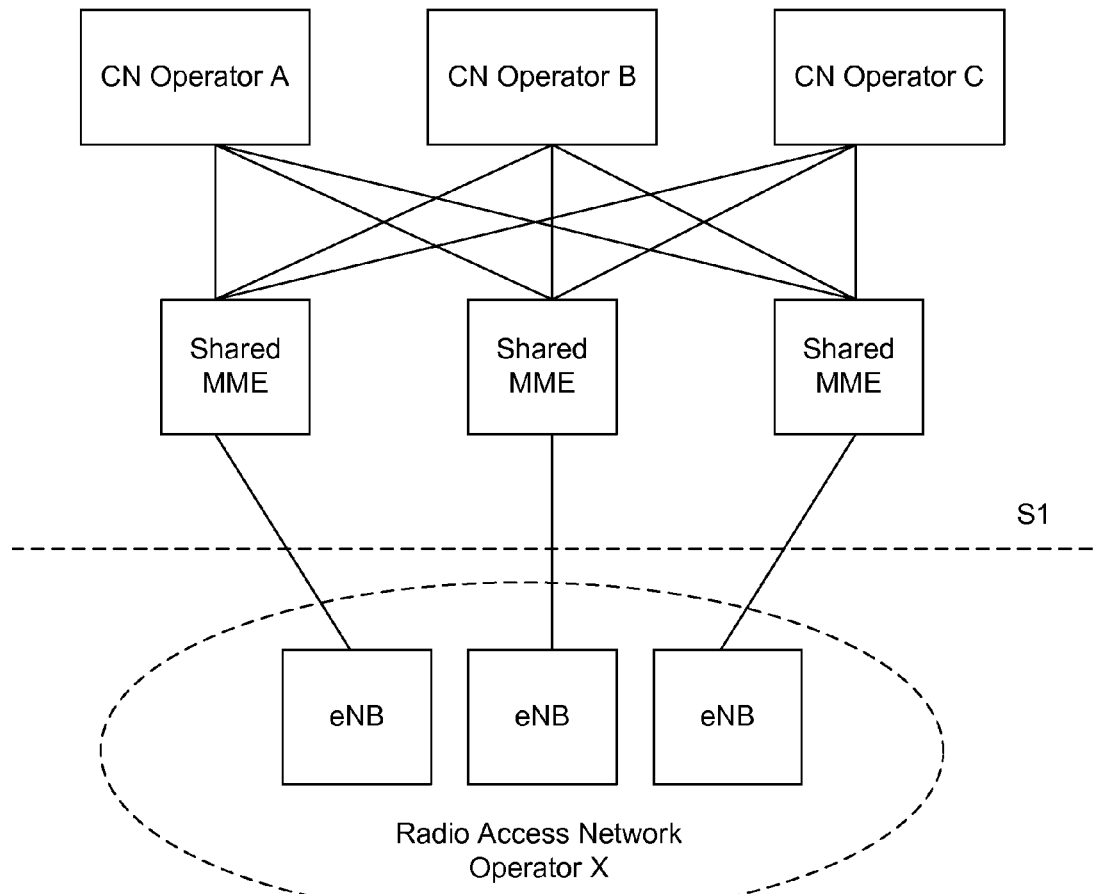
FIG. 1 is a system block diagram illustrating a gateway core network architecture.

FIG. 1 illustrates an example of a GWCN configuration for network sharing in which the core network operators share core network nodes (e.g., mobility management entities ("MMEs")) and radio access network nodes (e.g., eNBs) as described in TS 23.251.

Figure 2:
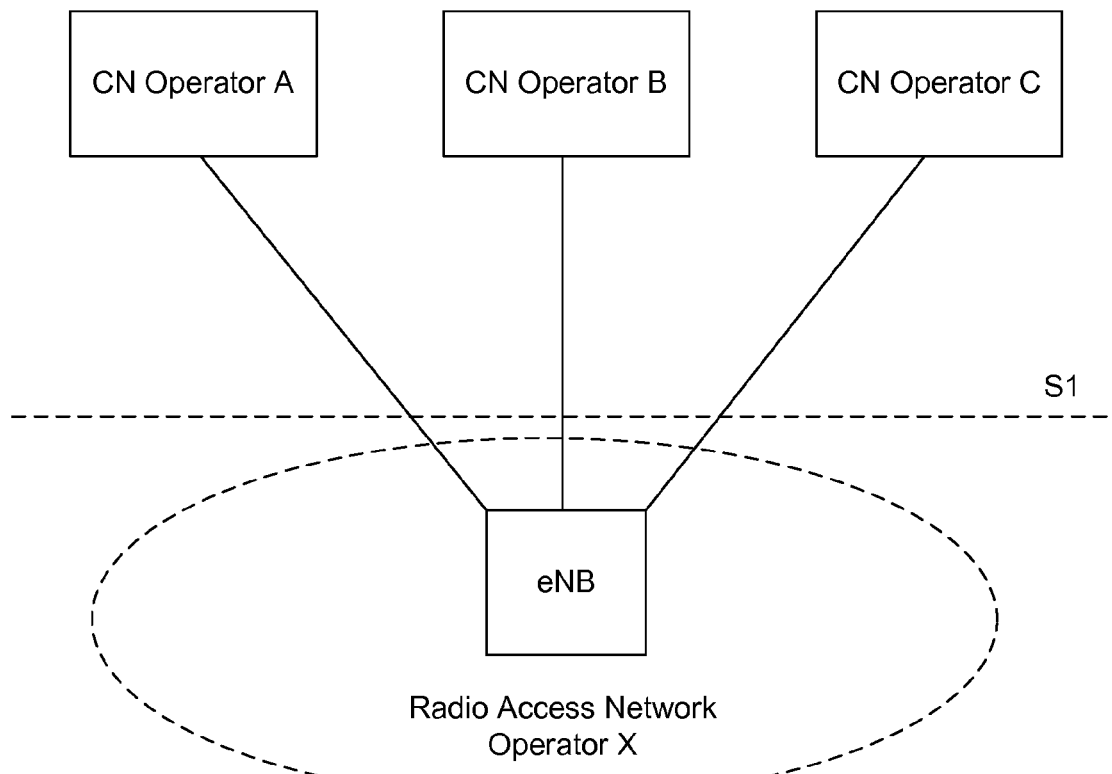
FIG. 2 is a system block diagram illustrating a multi-operator core network architecture.

FIG. 2 illustrates an example of a MOCN configuration for network sharing in which multiple CN nodes are connected to the same eNB and the CN nodes are operated by different network operators as described in TS 23.251.

Figure 3A:
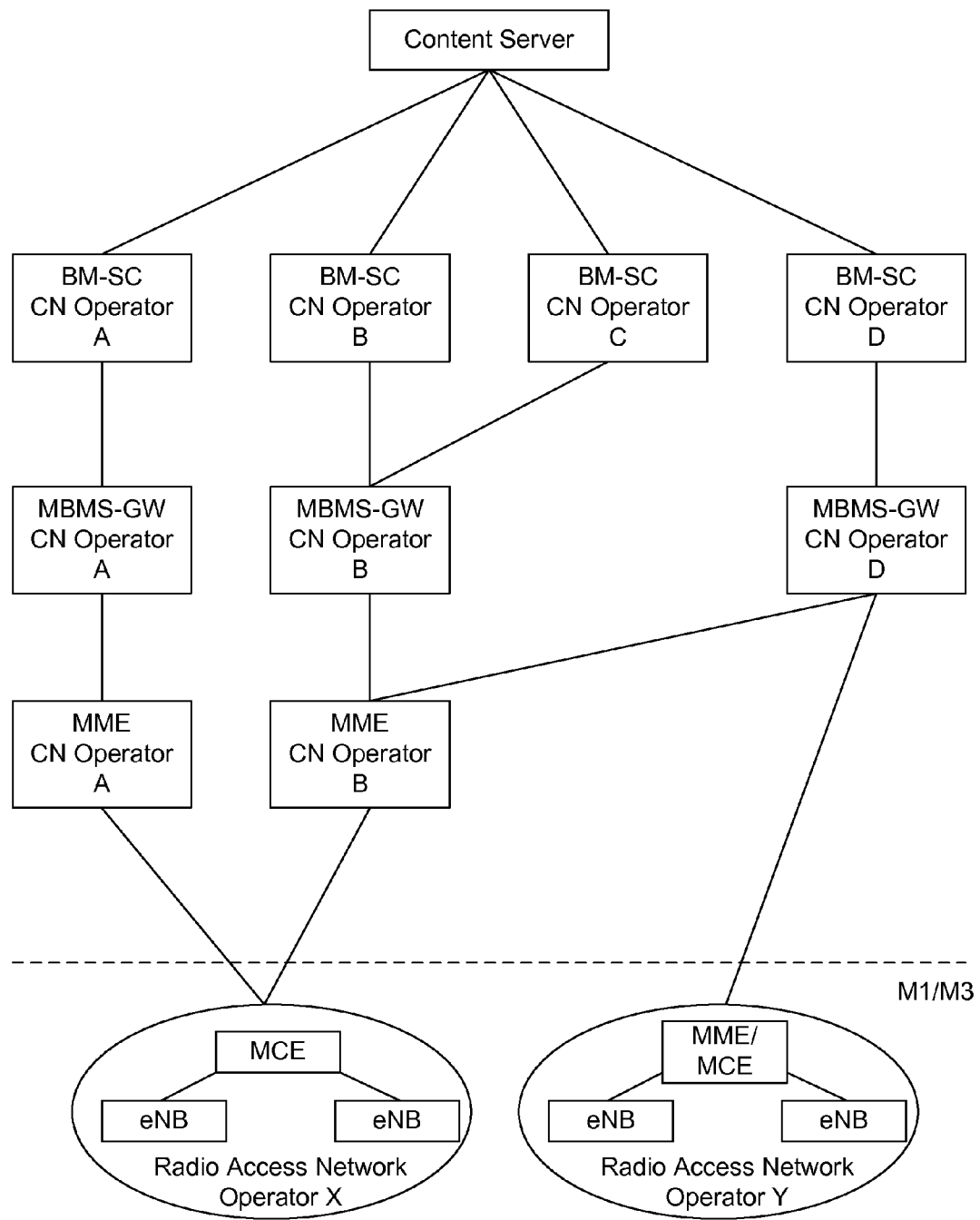
FIG. 3A is a system block diagram illustrating network architecture for network and content sharing for eMBMS.

FIG. 3A illustrates an example architecture for network sharing and content sharing for eMBMS. Each CN operator A, B, C, and D may interface with the content server to receive content for an MBMS service at their respective broadcast/multicast service center ("BM-SC"). CN operator A's BM-SC may interface with CN operator A's MBMS gateway ("MBMS-GW") which may interface with CN operator A's MME. CN operator A's MME may provide CN operator A's MBMS service to the multi-cell/multicast coordination entity ("MCE") of radio access network ("RAN") operator X's RAN which may provide the service to RAN operator X's eNBs. CN operator B's BM-SC may interface with CN operator B's MBMS-GW. CN operator C's BM-SC may also interface with CN operator B's MBMS-GW. In this manner, CN operator B's and CN operator C's MBMS service may be provided to operator B's MME. CN operator D's BM-SC may interface with CN operator D's MBMS-GW and CN operator D's MBMS-GW may provide CN operator D's MBMS service to CN operator B's MME. CN operator B's MME may provide CN operator B's, CN operator C's, and CN operator D's services to the MCE of RAN operator X's RAN which may provide the services to RAN operator X's eNBs. CN operator D's MBMS-GW may also provide CN operator D's service to a combined MME/MCE of RAN operator Y's RAN which may provide the service to network operator Y's eNBs.

The systems, methods, and devices of the various embodiments enable evolved Multimedia Broadcast Multicast Service ("eMBMS") network sharing. The various embodiments may enable MBMS service continuity across different public land mobile networks ("PLMNs") by associating the same MBMS services providing identical content in different PLMNs with each other. In an embodiment, the service discovery may be provisioned to a receiver device when or after the receiver device is attached to a PLMN. In an embodiment, content sharing across different PLMNs may be supported by a user service description ("USD") indicating the different temporary mobile group identifiers ("TMGIs") of the same service across different PLMNs. In another embodiment, content sharing across different PLMNs may be supported by a user service description indicating the same TMGI for the same service across different PLMNs.

In an embodiment, an eMBMS network sharing architecture may be integrated with a GWCN configuration and/or MOCN configuration. In such an architecture, when an eNB is shared, a MCE may also be required to be shared. Multicast broadcast single frequency network ("MBSFN") subframes and multicast control channel ("MCCH") configuration may be coordinated by the MCE. In such an architecture, the MBMS-GW and MME may or may not be shared. Up to 60 percent of an MBSFN allocation may be shared among different operators via operation and maintenance (O&M) systems, but in a network sharing embodiment there may be a need to have MBSFN allocation increased beyond 60% because it may be desirable to have one frequency band to deploy eMBMS in and share that frequency band among different operators.

In an embodiment, a BM-SC may generate a TMGI for a MBMS service by combining the MBMS service ID with the mobile country code ("MCC") and mobile network code ("MNC"). The MCC and MNC may be combined to identify a CN operator by the CN operator's public land mobile network ("PLMN") ID. The receiver device may have multiple subscriptions with different operators when it has multiple SIM card. A receiver device may use TMGIs to determine the MBMS service with which to register. For example, the receiver device may select TMGI(s) for one or more home PLMN ("HPLMN") of a visitor PLMN ("VPLMN"). When the receiver device selects a TMGI that does not belong to its HPLMN and the MBMS service is encrypted, MBMS keys (e.g., a MBMS service key ("MSK")) may be shared across BM-SCs of PLMNs and used to provide to the receiver device with a reception key to enable reception of the selected MBMS service. In another embodiment, information needed to protect MBMS keys (e.g., a receiver device specific key derived from root key (Ks) for the receiver device) may be sent from a home PLMN to VPLMNs. In such an embodiment, using TMGI filtering may require locating MCC/MNCs in TMGI lookup tables.

In another embodiment, the service layer or service class may identify that services belong to different operators. In such an embodiment, TMGI lookup may be avoided by using the service class to determine whether to register the MBMS services from HPLMN(s). Using the service class may make application/service layer configuration and management easier than using TMGI lookup tables.

In an embodiment, an MCE may apply allocation and retention priority ("ARP") per PLMN by looking at the MCC/MNC in the TMGI when an MBMS session is established. In an embodiment, shared MBMS content may be set to a higher ARP compared with non-shared content. Additionally, a BM-SC may indicate to an MCE that certain content is shared or non-shared content.

In an embodiment, when different CN operators share the same network equipment, content sharing by receiver devices associated with the different CN operators may enable only one instance of an MBMS service to have to be delivered over the air. In this manner, network resources may not be wasted transmitting the same content multiple times from different operators. Public safety scenarios are examples of when avoiding providing duplicate content may be advantageous. Another example in which avoiding providing duplicate content may be advantageous may be in-venue content scenarios in which receiver devices that subscribe to different cellular operators may be able to receive eMBMS service without requiring duplication of the content over the air from different CN operators. This avoidance of providing duplicate content may apply to licensed or unlicensed spectrum assuming the receiver device may support the corresponding frequency band. A receiver device may have one subscription with one CN operator or more than one subscription with multiple CN operators, for example the receiver device may be a dual-SIM receiver device with a SIM for each subscription. The receiver device may register with its HPLMN for unicast services (also referred to as the receiver device's registered PLMN ("RPLMN")), but may receive shared MBMS content from other PLMNs, for example by activating TMGIs associated with CN operators other than the CN operator of the HPLMN. In this manner, consumption of TMGIs belonging to different PLMNs in a HPLMN geographic coverage area and/or roaming using a VPLMN outside a HPLMN geographic coverage area may be enabled when content is shared across PLMNs. In such an embodiment, accounting and charging for transmission and reception of eMBMS services may be based on offline agreements among CN operators and service providers.

In an embodiment, a common USD or individual USDs may be used to indicate to a receiver device all the TMGIs for a MBMS service shared among different CN operators and service providers. Using the common USD or the individual USDs, the receiver device may select an MBMS service, determine the TMGI for the service in the current PLMN the receiver device is in, and activate the determined TMGI for the MBMS service. If the MBMS service is encrypted, the MSK for the service may be shared among BM-SCs of the CN operators or the information needed to protect MBMS keys generated by the BM-SCs of the CN operator (e.g., a receiver device specific key derived from root key (Ks) for the receiver device) may be sent from home PLMN to VPLMNs.

A receiver device may be preconfigured with bootstrapping information for service discovery, such as a USD entry point (e.g., a unicast server URL) for acquiring a USD via a unicast channel or broadcast information (e.g., a session description protocol ("SDP"), TMGI, IP address/port, etc.) for acquiring a USD via a broadcast channel. Pre-configuring the receiver device may not be flexible when the receiver device is in a VPLMN because the receiver device may not include bootstrapping information for the VPLMN. When CN operators have a pre-established roaming agreement, bootstrapping information for multiple CN operators covered under the roaming agreement may be preconfigured on the receiver devices of those CN operators.

In an embodiment, a receiver device may download a provisioning URL when or after the receiver device is attached to a VPLMN to enable service discovery when the receiver device is roaming. The URL may be provided to the receiver device via Open Mobile Alliance device management ("OMA-DM"), via short message service ("SMS") point to point or cell broadcasting, via domain name system ("DNS") look up, wireless access protocol ("WAP") push, and/or via a public data network ("PDN") procedure (e.g., via a designated protocol configuration option ("PCO")).

In an embodiment, information to acquire a USD through a broadcast channel may be standardized across PLMNs to enable service discovery when the receiver device is roaming. Information that may be standardized may include the session description protocol ("SDP") which includes TMGI, IP address/port for the USD, etc., and the receiver device may discover available TMGIs from the MCCH. In an embodiment, session parameters for USD download over eMBMS may include a number of channels in the session which may be set to one, the destination IP address and port number for each channel in the session per media which may be the IP multicast address and port, the protocol ID which may be FLUTE/UDP, the mode of an MBMS bearer for each media which may be set to broadcast-sfn mode and include a TMGI, and the service languages per media which may be set to English. The sender IP address may not be needed in the session parameters. The transport session identifier ("TSI"), start time and end time of the session, media types and fmt-list, and forward error correction ("FEC") capabilities and related parameters may not be listed in the session parameters because these parameters may be available via the file delivery table ("FDT").

In an embodiment, the MBMS service ID for a service may be standardized across PLMNs used for a USD to enable network sharing and roaming. For example, six digit MBMS service IDs in the range from 000000 to 000031 may be reserved for a USD. In this manner, the first six digits of all TMGIs for a USD may be the same and identify the service as a USD. The MCC and MNC forming the rest of the TMGI may reflect the PLMN ID of the CN operator associated with the TMGI. When the receiver device discovers a TMGI service ID within the range (for example within 00000 to 000031) available from MCCH, the receiver device may identify the service to be a USD. In this manner, the receiver device may use hard coded SDP parameters to acquire a USD from the broadcast channel.

In an embodiment, a multicast IP address and port may be reserved for a USD to enable network sharing. For example, in Internet Protocol Version 4 ("IPv4"), the multicast IPv4 address range 239.192.0.0 may be reserved for USD use. As another example, in Internet Protocol Version 6 ("IPv6"), the multicast address range FF18::0 may be reserved for USD use. Additionally, a private port 49152 or a five bit range of ports from 49152 to 49183 may be reserved for USD use. When multicast IP addresses and/or ports are reserved, a receiver device may be provisioned with information, such as a table, mapping multicast IP addresses and port numbers to TMGI service IDs.

In an embodiment, dynamic MBMS resource allocation for different PLMNs may be enabled using feedback from eNBs on resource availability. Additionally, accounting/charging records may be sent from the radio access network operators to CN network operators which may indicate resource usage levels.

In an embodiment, HTTPS may be used for reception reporting and/or file repair for confidentially protection. The receiver device may use a preconfigured list of trusted root certificates for transport layer security ("TLS") server certification and validation. Pre-configuring the receiver device with trusted root certificates may not be flexible when the receiver device is in a VPLMN because the receiver device may not include trusted root certificates for the VPLMN. When CN operators have a pre-established roaming agreement, trusted root certificates for multiple CN operators covered under the roaming agreement may be preconfigured on the receiver devices of those CN operators. In an embodiment, roaming security may be enabled using enhanced MSK key requests and MBMS service registration procedures to deliver certificate authority ("CA") certificates to the receiver device. Alternatively, instead of using a public key infrastructure ("PKI"), an operator self signed cert or simpler public key (e.g., a key signed using the MBMS Request Key (MRK) may be used to authenticate the server.

When a receiver device is roaming in a VPLMN and in idle mode, the receiver device may need to search for available PLMNs. For example, the receiver device may attempt to obtain service for automatic mode over the period of eight hours every six minutes or, if no period value is configured, may attempt to obtain service every sixty minutes. Should the receiver device be roaming in a VPLMN and receiving an eMBMS service in the VPLMN when the receiver device, attempting to obtain service by searching for available PLMNs may interrupt the eMBMS service. Even though the same service may be provided in the HPLMN and VPLMN, the TMGIs for the service may be different due to the PLMN IDs being different, and the eMBMS service may be interrupted by searching for available PLMNs. In an embodiment, when the receiver device is receiving an MBMS service in a VPLMN, user preference and/or CN operator policy may allow the receiver device to bypass PLMN search. In this manner, service continuity may be maintained when the receiver device is roaming on a VPLMN. Current SAIs doe not convey PLMN ID information because SAIs are only unique within a PLMN. In an embodiment, the indication of other PLMN's SAIs in the SIB 15 (or through other SIBs) may enable the receiver device to determine whether the HPLMN, extended HPLMN ("EHPLMN"), or VPLMN also has the service of interest. For example, the receiver device may determine whether the HPLMN, EHPLMN, or VPLMN has the service of interest in two manners: 1) by adding the associated PLMN ID information in addition to SAI information in the SIBs provided to the receiver device; or 2) by extending the SAI to include PLMN ID information.

Figure 3B:
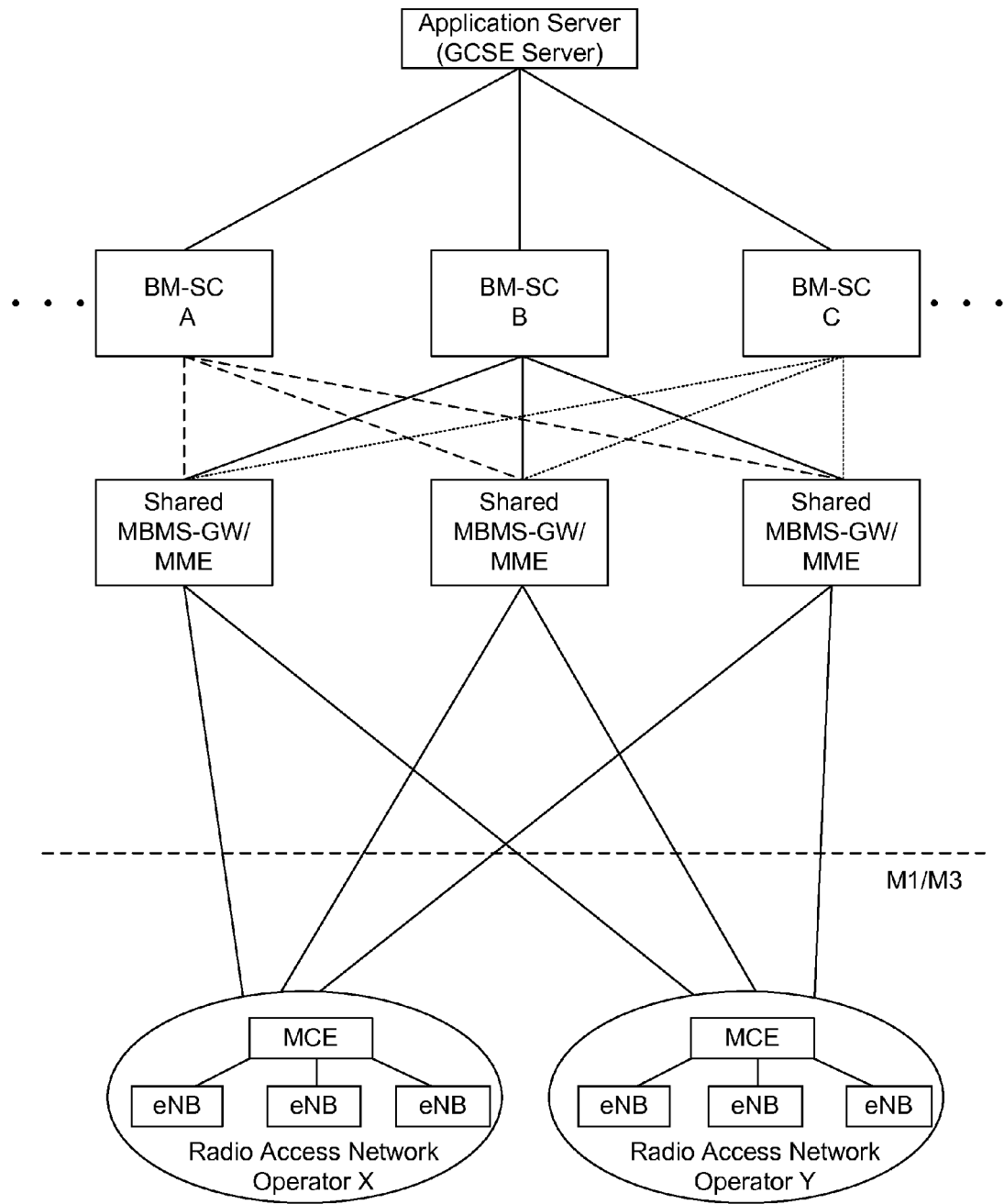
FIG. 3B is a system block diagram illustrating network architecture for eMBMS network sharing for public safety.

The various embodiments may be useful in deploying a public safety network ("PSN") and/or group call. FIG. 3B is a system block diagram illustrating a network architecture for eMBMS network sharing for public safety according to an embodiment. FIG. 3B illustrates possible different embodiment scenarios for sharing of public safety information from a PSN and/or group call application server (e.g., a Group Communication System Enabler ("GCSE") server). In a first scenario, the PSN and/or group call application server may deploy its own radio and core network. In a second scenario, a PSN and/or group call application server may share a CN and/or a RAN with one wireless operator. In a third scenario, a PSN and/or group call application server may share a CN and/or a RAN with multiple wireless operators. For example, a PSN and/or group call application server may use one wireless operator's network as a primary network, and another wireless operator's network as a backup network for reliability transmission or to avoid network congestions. As another example, a PSN and/or group call application server may use different wireless operators' networks in different regions. In all the above scenarios or any combinations of the above scenarios, the PSN and/or group call application server may own the TMGI space (for example, the PSN and/or group call application server may have its own MCC and MNC). Group member receiver devices may know the TMGI to which the receiver device belongs and the RAN providers may provide a higher priority to that TMGI. In an embodiment, the PSN and/or group call application server may use different TMGIs belonging to different wireless operators. Group member receiver devices may know the different TMGIs associated with the same group call through USD and/or application signaling, and the RAN providers may not duplicate content send over the air associated with the TMGIs. The RAN provider may also provide high priority to the TMGIs. In addition, the receiver device may also indicate to the PSN and/or group call application server its location in a PLMN (for example, PLMN ID, Service Area ID, MBSFN area ID, and/or cell ID) such that the PSN and/or group call application server may select the corresponding BM-SC in the PLMN that the receiver device is using. The interface between the BM-SC and PSN/application server may be used to exchange the information on MBMS session setup and status information, QoS, and USD.

The various embodiments may improve the functioning of networks and/or receiver devices by enabling eMBMS network sharing and roaming that would otherwise not be provided by conventional networks and/or receiver devices. Additionally, the various embodiments may improve the functioning of networks and/or receiver devices by enabling network sharing that may enable multiple operators or service providers to share a capacity of a physical network. Further, the various embodiments may improve the functioning of networks and/or receiver devices via roaming that would not otherwise be provided by conventional networks and/or receiver devices that may enable embodiment receiver devices to receive services when not located in the receiver devices' home networks. The various embodiments may improve the functioning of networks and/or receiver devices by overcoming conventional limitations in sharing content across networks and/or by improving eMBMS reception in a roaming network. The various embodiments may also improve the functioning of networks and/or receiver devices by enabling Multimedia Broadcast Multicast Service ("MBMS") service continuity across two or more different public land mobile networks ("PLMNs") wherein one instance of the MBMS service is broadcast in each of the two or more different PLMNs in a manner different from of conventional networks and/or receiver devices.

Figure 4:
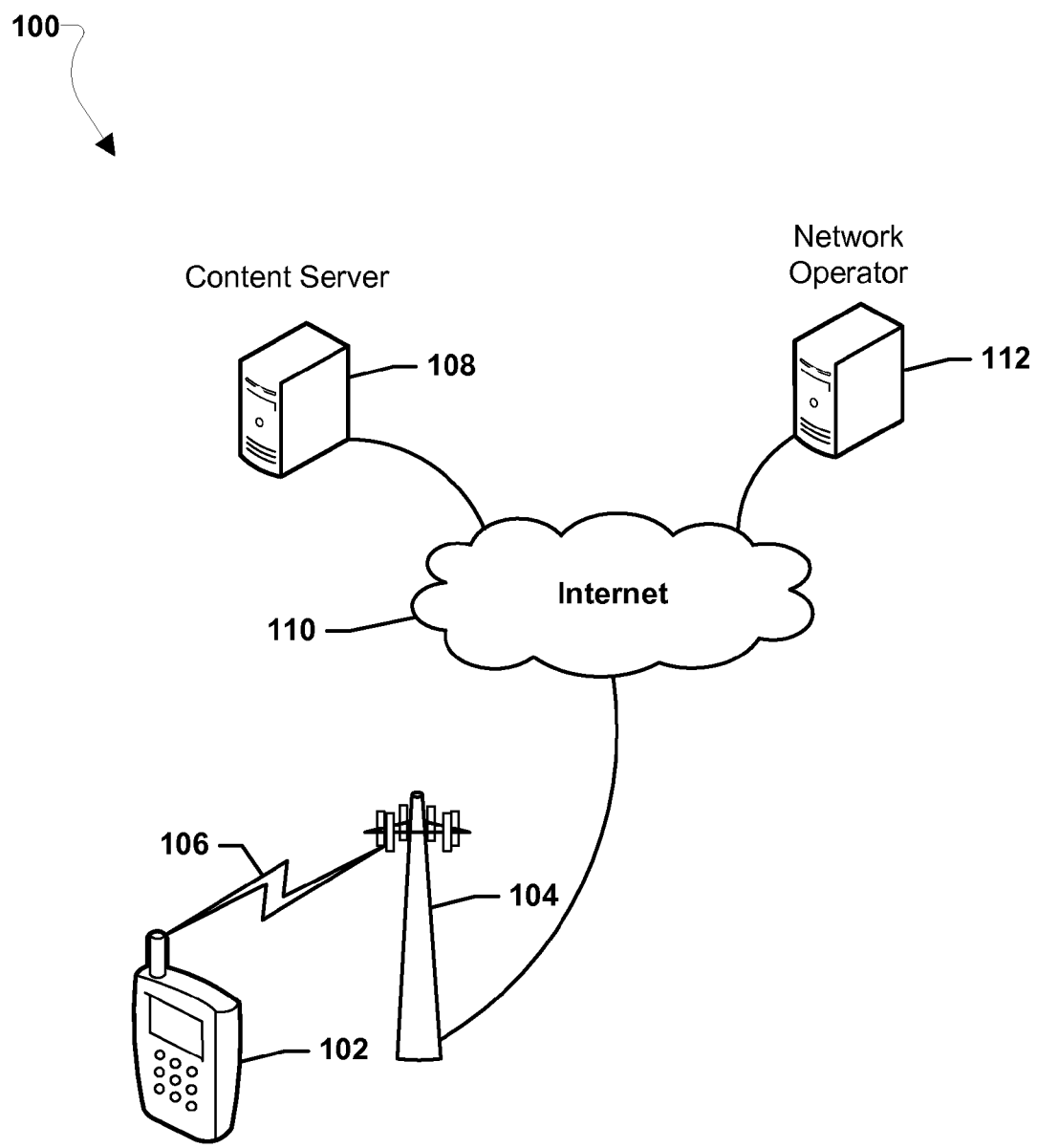
FIG. 4 is a communication system block diagram of a network suitable for use with the various embodiments.

FIG. 4 illustrates a network system 100 suitable for use with the various embodiments. The cellular network system 100 may include multiple devices, such as a receiver device 102, one or more cellular towers or base stations 104, and one or more servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router that may connect to the Internet 110. In this manner, data may be exchanged between the receiver device 102 and the server(s) 108 and 112 via the connections to the cellular tower or base station 104, and/or Internet 110. In an embodiment, server 108 may be a content server or encoder, such as an encoder providing MPDs and/or segments for output via a DASH client. In an embodiment, server 112 may be a network operator server controlling the operations of the content server 108, the cellular network including the receiver device 102 and the cellular tower or base station 104, and controlling the over the air ("OTA") transmission of content to the receiver device 102. For example, a network operator server 112 may control the content server 108 and the cellular network including the receiver device 102 and the cellular tower or base station 104 to provide one or more service to the receiver device 102 via unicast and/or broadcast OTA transmissions. While features of embodiment receiver devices and networks may be described with reference to OTA transmissions, these features may be used in connection with wired transmissions, wireless transmissions, or a combination of wired and wireless transmissions. Thus, OTA transmission is not required.

Figure 5:
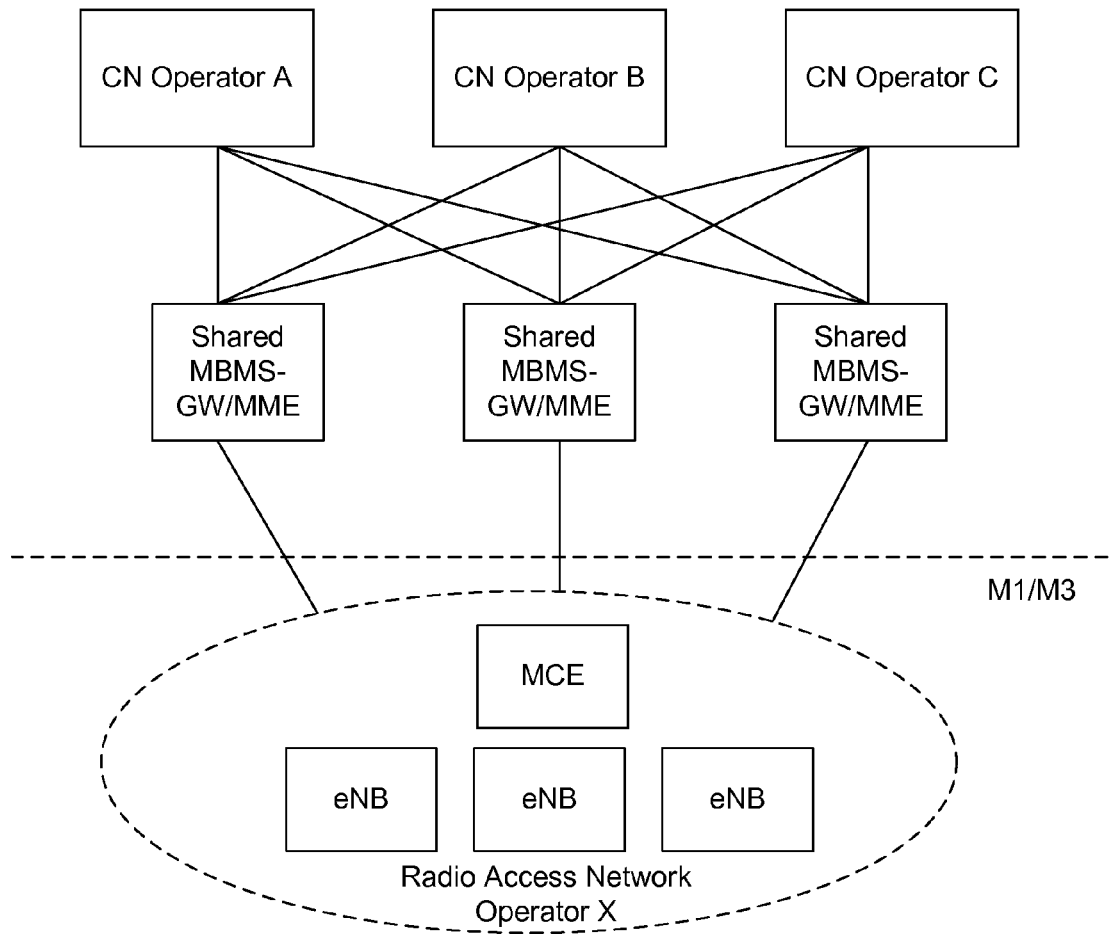
FIG. 5 is a system block diagram illustrating a gateway core network architecture according to an embodiment.

FIG. 5 is a system block diagram illustrating a GWCN architecture according to an embodiment. In the GWCN, CN operators A, B, and C may interface with shared MBMS-GW/MMEs through the M1/M3 interfaces.

Figure 6:
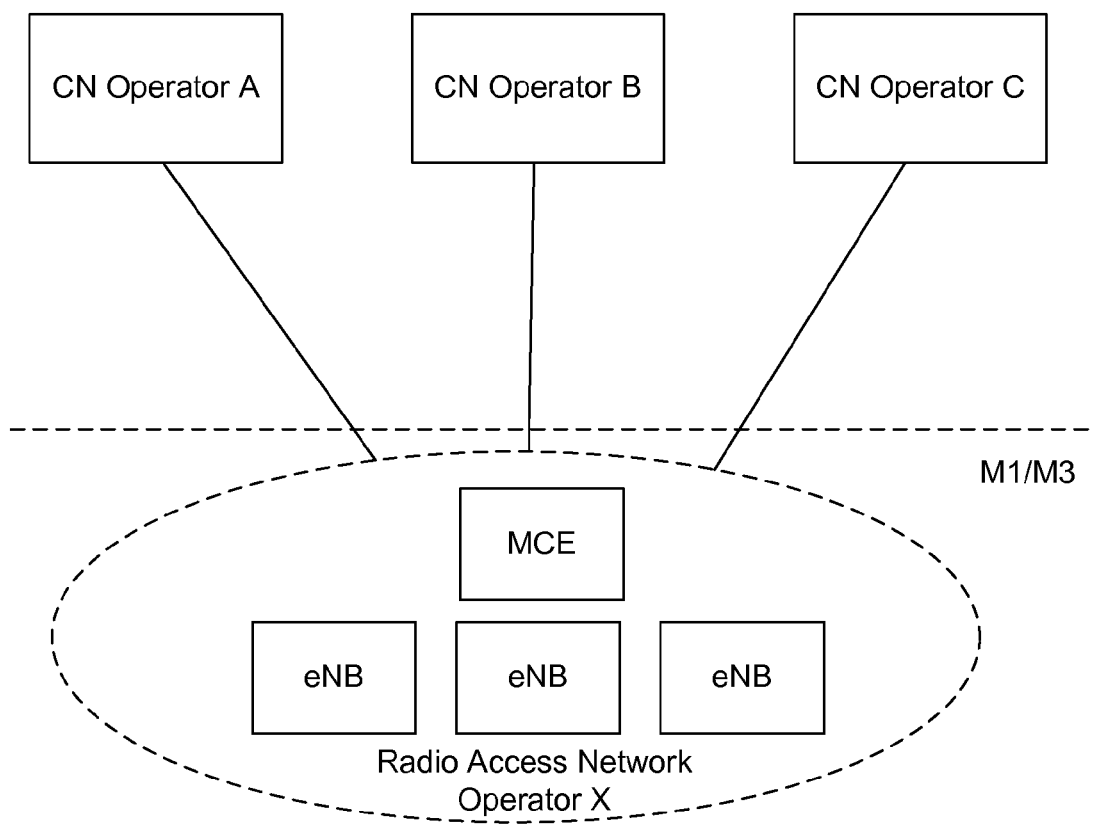
FIG. 6 is a system block diagram illustrating a multi-operator core network architecture according to an embodiment.

FIG. 6 is a system block diagram illustrating a MOCN architecture according to an embodiment. In the MOCN CN operators A, B, and C may interface directly with an MCE through the M1/M3 interfaces.

In both of the architectures illustrated in FIGS. 5 and 6, since MBSFN subframes and MCCH configuration may be coordinated by the MCE, the MCE may be shared if eNBs are shared among different operators. In an embodiment, for frequency division duplexing ("FDD"), up to 60% of the radio resource may be allocated to an MBSFN and up to eight MBSFN areas may be supported per eNB. Those allocated/ supported MBSFN resources/MBSFN areas may need to be shared and coordinated among different operators via O&M systems. In an embodiment, different operators may use different MBSFN areas or may share the same MBSFN area. The TMGI may include the MCC and MNC (PLMN ID). The MCE may apply ARP per operator by looking at MCC/MNC included in TMGI when an MBMS session is established. The admission control across multiple operators may be set through O&M systems. The receiver device may decide which TMGI(s) to register and may select TMGI(s) belongs to its HPLMN. The receiver device may also select TMGI(s) belongs to a VPLMN, assuming the receiver device may acquire service discovery bootstrapping information and may acquire any necessary keys.

Figure 7:
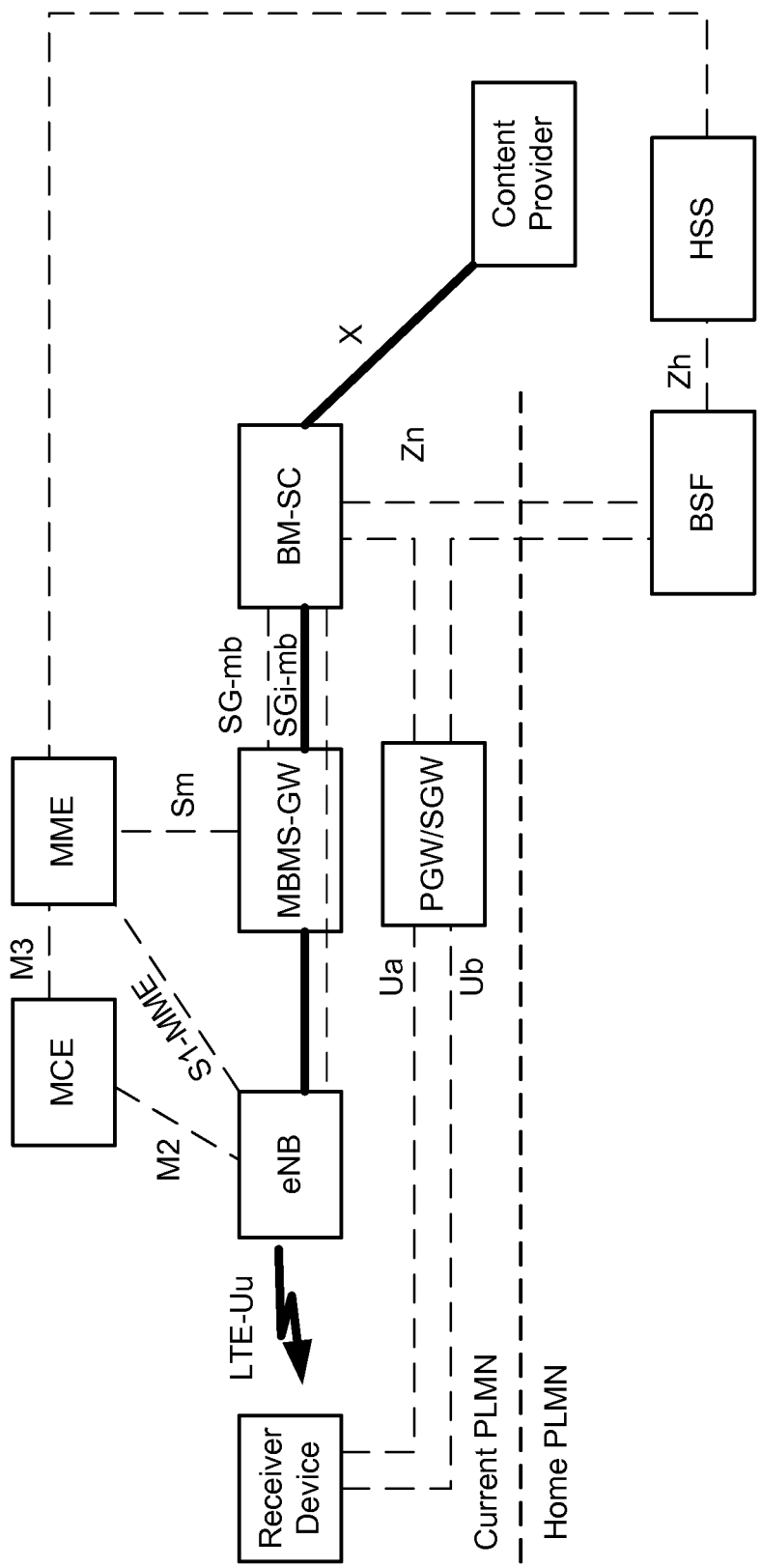
FIG. 7 is a system block diagram illustrating elements of a current and home PLMN according to an embodiment.

FIG. 7 is a system block diagram illustrating elements of a current PLMN and a HPLMN according to an embodiment. The configuration illustrated in FIG. 7 may be applicable during content sharing when the receiver device is inside the HPLMN geographic coverage area, for example not roaming, and applicable during content sharing when the receiver device is outside the HPLMN geographic coverage area and within a VPLMN geographic coverage area, for example roaming. The current PLMN may be the PLMN with which the receiver device is registered, and the current PLMN may be the PLMN of the BM-SC that owns the TMGI of the MBMS service that is being broadcast in the current PLMN. The MBMS service may be the same service broadcast using the same content from the content provider in both the current PLMN and HPLMN, and via content sharing only one instance of the service may be broadcast in the current PLMN and the HPLMN. The TMGI for the service may be unique to each PLMN, such that when the receiver device is registered with the current PLMN only the TMGI of the service in the current PLMN may be activated by the receiver device.

When the MBMS service is encrypted, information for the HPLMN may be required to enable the MBMS service to be decrypted by the receiver device. The bootstrapping server function ("BSF") of the HPLMN may be in communication with the BM-SC of the current PLMN and the home subscriber service ("HSS") of the HPLMN may be in communication with the MME of the current PLMN. Using data from the HSS and the receiver device the BSF may provide information, such as a shared secret key ("Ks"), to the BM-SC of the current PLMN. Using the information provided from the BSF of the home network the BM-SC of the current network may protect MBMS keys, such as an MSK, for decrypting the MBMS service and provide the encrypted MBMS keys (e.g., one or more encrypted MBMS key) to the receiver device. In this manner, the receiver device may be enabled to decrypt the MBMS service provided by the current PLMN using the provided MBMS keys.

Figure 8:
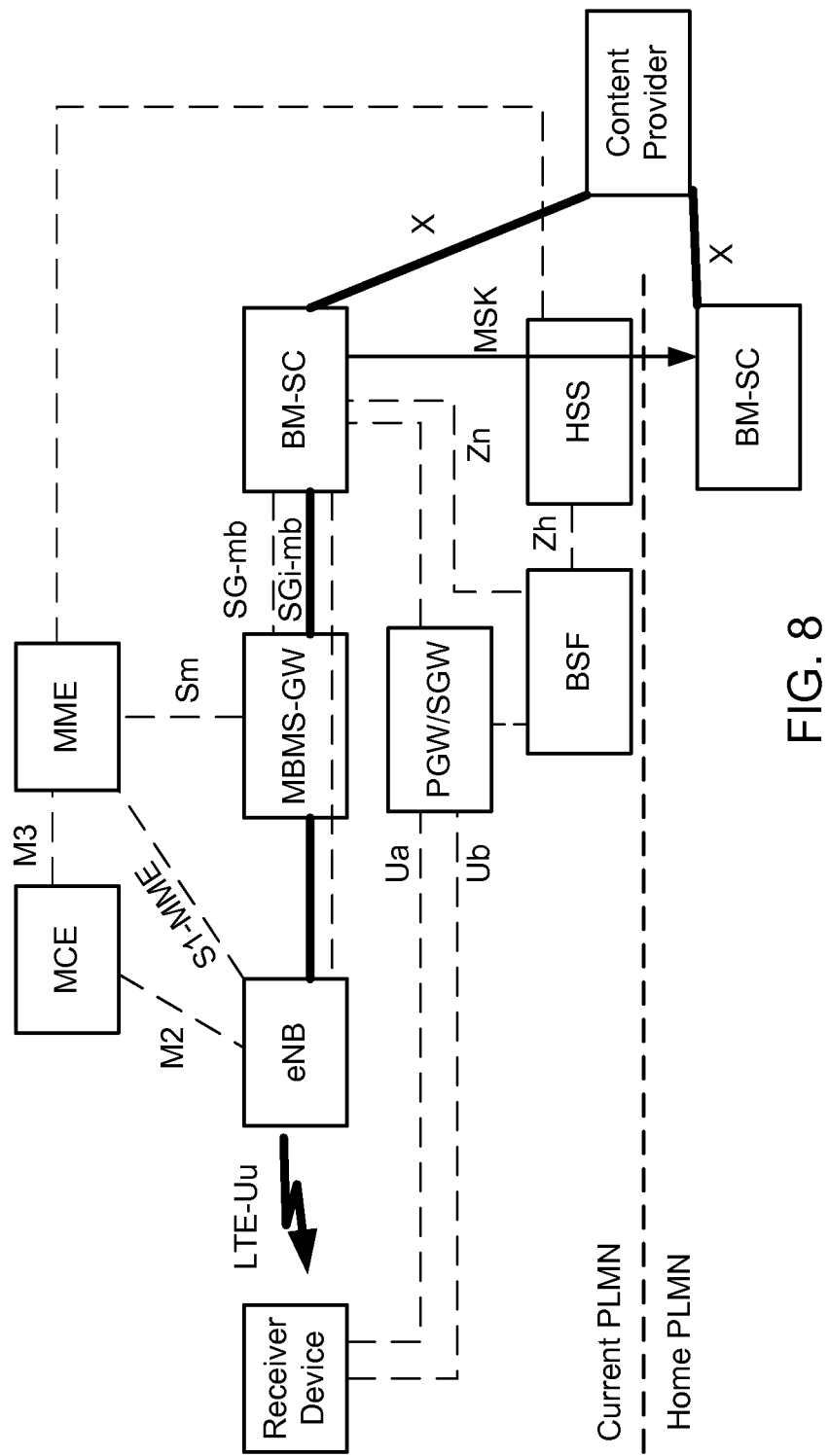
FIG. 8 is a system block diagram illustrating elements of a current and home PLMN according to another embodiment.

FIG. 8 is a system block diagram illustrating elements of a current PLMN and a HPLMN according to an embodiment. The configuration illustrated in FIG. 8 may be applicable during content sharing when the receiver device is inside the HPLMN geographic coverage area, for example not roaming, and applicable during content sharing when the receiver device is outside the HPLMN geographic coverage area and within a VPLMN geographic coverage area, for example roaming. The current PLMN may be the PLMN with which the receiver device is registered, and the current PLMN may be the PLMN of the BM-SC that owns the TMGI of the MBMS service that is being broadcast in the current PLMN. The MBMS service may be the same service broadcast using the same content from the content provider in both the current PLMN and HPLMN, and via content sharing only one instance of the service may be broadcast in the current PLMN and the HPLMN. The TMGI for the service may be unique to each PLMN, such that when the receiver device is registered with the current PLMN only the TMGI of the service in the current PLMN may be activated by the receiver device.

When the MBMS service is encrypted, an MBMS key for the HPLMN may be required to enable the MBMS service to be decrypted by the receiver device. The BM-SC of the HPLMN may be in communication with the BM-SC of the current PLMN. The MBMS key is generated in the BM-SC of the current PLMN and is provided from the BM-SC of the current PLMN to HPLMN. The receiver device performs MBMS user service registration with the BM-SC in HPLMN and obtains the MBMS key. In this manner, the receiver device may be enabled to decrypt the MBMS service provided by the current PLMN using MBMS keys received from the HMPLN of the receiver device.

Figure 9A:
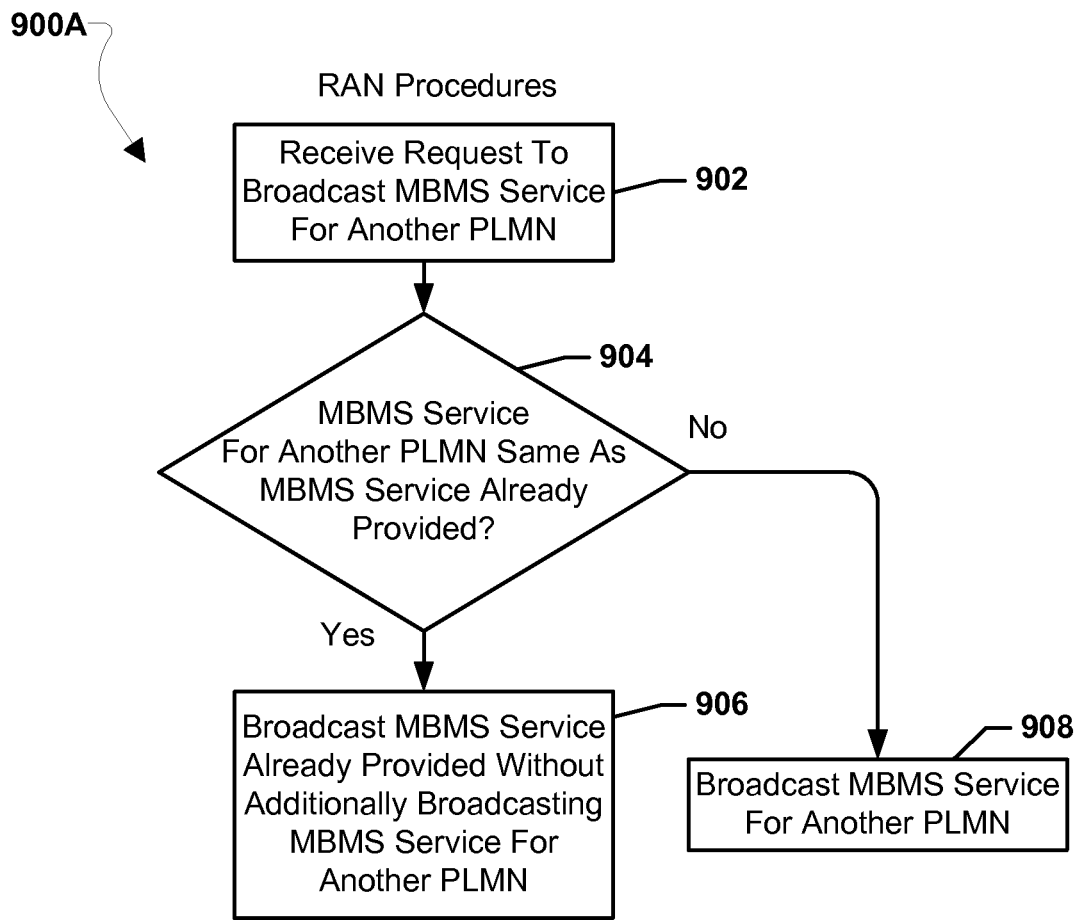
FIGS. 9A and 9B are process flow diagrams illustrating embodiment methods for content sharing across different PLMNs.

FIG. 9A illustrates an embodiment method 900A for content sharing when a radio network is shared across different PLMNs. In an embodiment, the operations of method 900A may be performed by an entity of the RAN (for example, an MCE). In block 902 the MCE may receive a request to broadcast an MBMS service for another PLMN. In determination block 904 the MCE may determine whether the MBMS service for the another PLMN is the same as an MBMS service already provided by the RAN.

In response to determining that that the MBMS services are identical (i.e., determination block 904="Yes"), the MCE may broadcast the MBMS service already provided without additionally broadcasting the MBMS service for another PLMN in block 906. In this manner, network resources may be conserved by only broadcasting one instance of the service, thereby not duplicating broadcast of content for identical services. In response to determining that the MBMS services are not identical (i.e., determination block 904="No"), the MCE may add new service and broadcast it for the another PLMN in block 908.

Figure 9B:
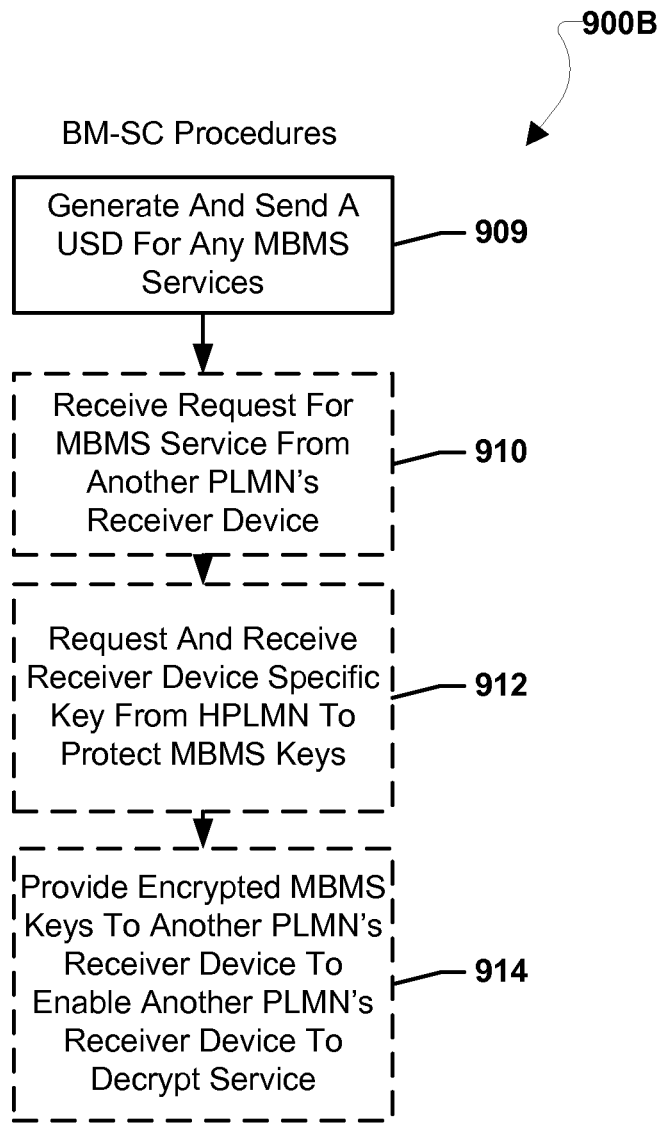

FIG. 9B illustrates an embodiment method 900B for content sharing when a radio network is shared across different PLMNs. In an embodiment, the operations of method 900B may be performed by a BM-SC in conjunction with the operations of method 900A performed by the MCE and described above with reference to FIG. 9A. In block 909 the BM-SC, via configuration, may generate and send a USD for any MBMS services broadcast by the BM-SC. In an embodiment, the USD may indicate all TMGIs associated with the same service in all PLMNs sharing radio network resources. In another embodiment, the USD may indicate a TMGI owned by the service provider and sent across all PLMNs sharing radio network resources. The USD may also indicate whether the receiver device is performing MBMS user service registration with the current PLMN or home PLMN.

When the MBMS service is encrypted, in optional block 910 the BM-SC server may receive a request for a MBMS service from another PLMN's receiver device. In optional block 912 the BM-SC server may request and receive a device specific key from the home PLMN to protect MBMS keys, such as MSK. In optional block 914 the BM-SC server may provide the encrypted MBMS keys to another PLMN's receiver device to enable the another PLMN's receiver device to decrypt the MBMS service. Alternatively MBMS keys may be shared among BM-SCs of the PLMNs sharing network resources.

Figure 10:
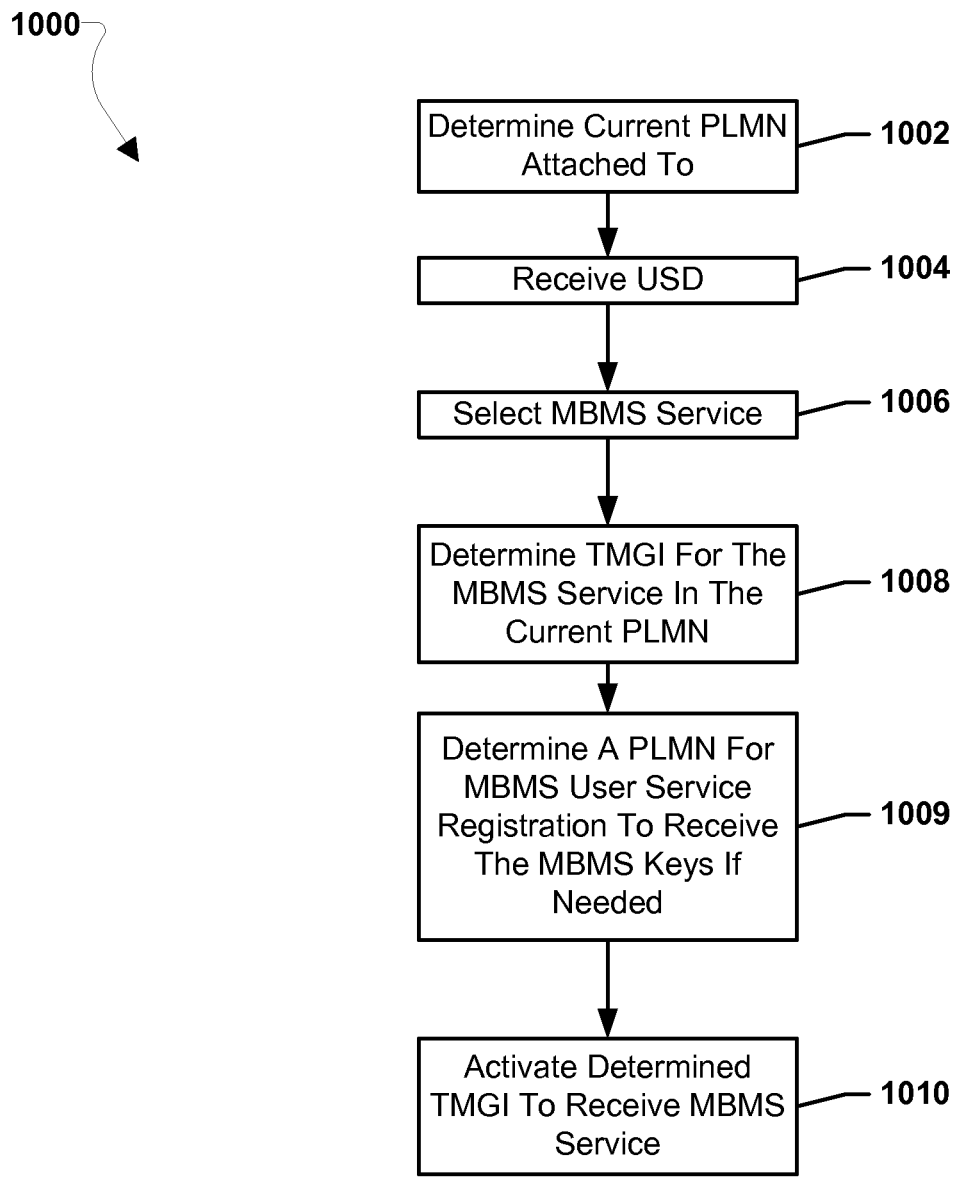
FIG. 10 is a process flow diagram illustrating an embodiment method for activating a shared service.

FIG. 10 illustrates an embodiment method 1000 for activating a shared service. In an embodiment, the operations of method 1000 may be performed by the processor of a receiver device in conjunction with the operations of methods 900A and 900B described above with reference to FIGS. 9A and 9B. In block 1002 the receiver device processor may determine the current PLMN to which the receiver device is attached. The current PLMN may be a PLMN other than the receiver devices HPLMN, and the current PLMN may be a PLMN within a geographic coverage region of the HPLMN or a VPLMN outside the geographic coverage region of the HPLMN that the receiver device may be roaming on. As an example, the receiver device may determine a current public land mobile network ("PLMN") of two or more different PLMNs the receiver device is attached to.

In block 1004 the receiver device processor may receive a USD. In an embodiment, the USD may be downloaded via a provisioning URL downloaded from the current PLMN when the receiver device is attached to the current PLMN. As examples, the provisioning URL may be downloaded via Open Mobile Alliance device management ("OMA-DM"), short message service ("SMS"), domain name system ("DNS") look up, wireless access protocol ("WAP") push, or a public data network ("PDN") attachment procedure. In an embodiment, the USD may indicate all TMGIs for the MBMS service across all PLMNs broadcasting the service. In an embodiment, USDs may be downloaded over eMBMS broadcast using session parameters standardized across PLMNs. For example, the USD may be downloaded via a reserved TMGI, reserved IP address and reserved port number that may be same for all PLMNs for USD. In an embodiment, the receiver device may determine the reserved IP addresses, reserved ports, and/or reserved MBMS service IDs using a table stored in memory, such as the example table 1100 described below with reference to FIG. 11. In a further embodiment, the MBMS service ID or TMGI service ID for each MBMS service may be the same in each PLMN.

The receiver device processor may select a MBMS service in block 1006, and determine the TMGI for the MBMS service that is being broadcast in the current PLMN in block 1008. In block 1009 the receiver device processor may determine the PLMN to which the receiver device is performing MBMS user service registration to receive the MBMS keys if needed. The PLMN may be a PLMN other than the receiver devices HPLMN, and the current PLMN may be a PLMN within a geographic coverage region of the HPLMN or a VPLMN outside the geographic coverage region of the HPLMN that the receiver device may be roaming on. In block 1010 the receiver device may activate the determined TMGI to receive the MBMS service from the PLMN.

FIG. 11 illustrates example elements of a reserved TMGI, address, and port table 1100. The table 1100 may include entries for reserved IPv4 address, reserved IPv6 address, reserved port numbers, and reserved TMGI service IDs (e.g., MBMS service IDs) for USD reception over the broadcast channel. The table 1100 may correlate reserved IPv4 addresses, IPv6 addresses, reserved ports, and reserved TMGI service IDs with one another. In this manner, a receiver device having access to the table 1100 may identify the port and addresses that may be reserved for each TMGI service ID.

Figure 12:
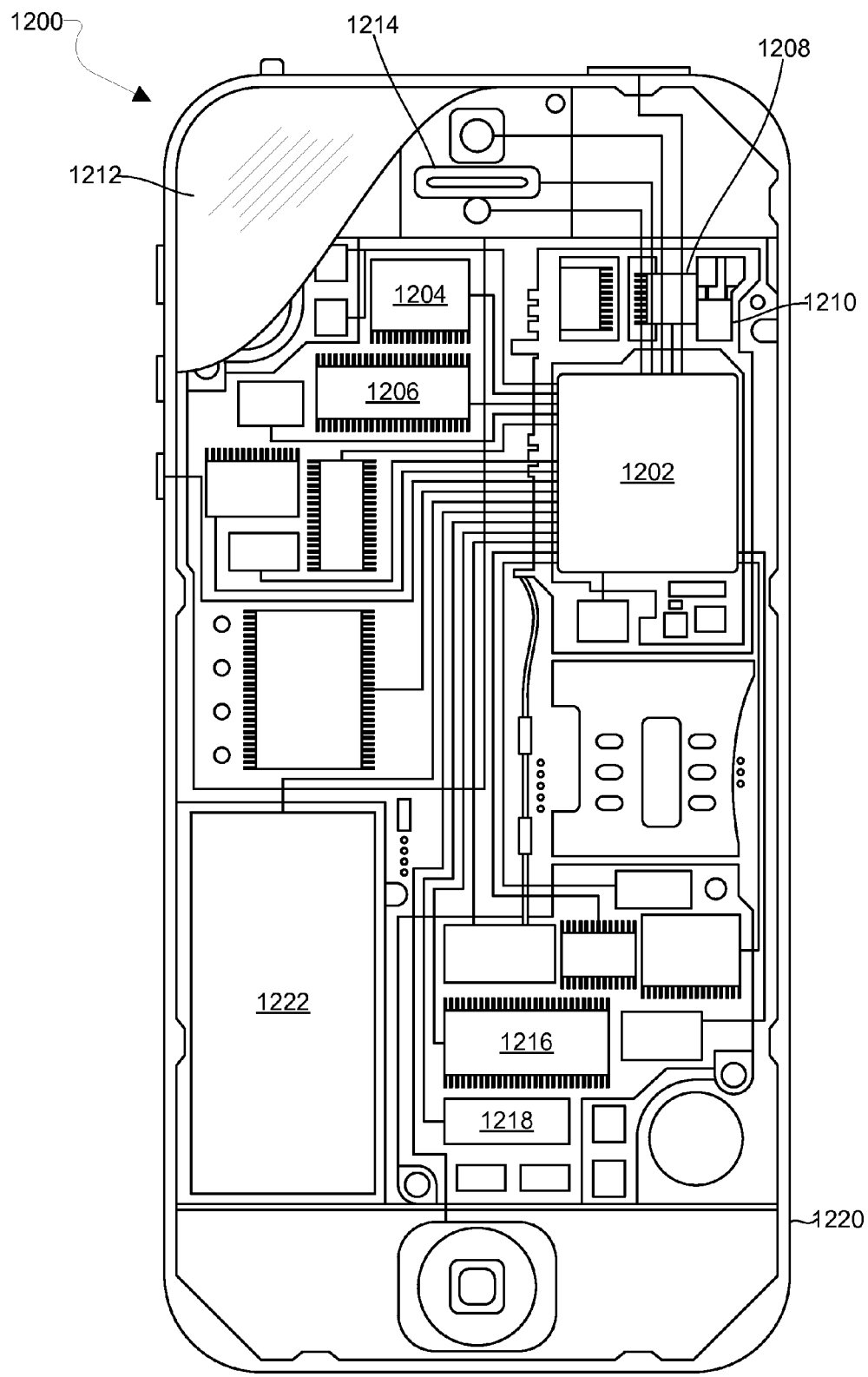
FIG. 12 is a component block diagram of an example receiver device suitable for use with the various embodiments.

The various embodiments (including, but not limited to, embodiments discussed above with reference to FIGS. 7, 8, 10, and 11) may be implemented in any of a variety of receiver devices, an example of which is illustrated in FIG. 12. For example, a receiver device 1200 implementing an embodiment may include a processor 1202 coupled to internal memories 1204 and 1206. Internal memories 1204 and 1206 may be volatile or non-volatile memories, and may also be secure and/or encrypted memories, or unsecure and/or unencrypted memories, or any combination thereof. The processor 1202 may also be coupled to a touch screen display 1212, such as a resistive-sensing touch screen, capacitive-sensing touch screen infrared sensing touch screen, or the like. Additionally, the display of the receiver device 1200 need not have touch screen capability. The receiver device 1200 may have one or more radio signal transceivers 1208 (e.g., Peanut®, Bluetooth®, Zigbee®, Wi-Fi, RF radio) and antennae 1210, for sending and receiving, coupled to each other and/or to the processor 1202. The receiver device 1200 may include a cellular network interface, such as wireless modem chip 1216, that enables broadcast and/or unicast communication via a cellular data network (e.g., CDMA, TDMA, GSM, PCS, 3G, 4G, LTE, and/or any other type of cellular data network) and is coupled to the processor 1202. The receiver device 1200 may include a peripheral device connection interface 1218 coupled to the processor 1202. The peripheral device connection interface 1218 may be singularly configured to accept one type of connection, or multiply configured to accept various types of physical and communication connections, common or proprietary, such as USB, FireWire, Thunderbolt, or PCIe. The peripheral device connection interface 1218 may also be coupled to a similarly configured peripheral device connection port. The receiver device 1200 may also include speakers 1214 for providing audio outputs. The receiver device 1200 may also include a housing 1220, constructed of a plastic, metal, or a combination of materials, for containing all or some of the components discussed herein. The receiver device 1200 may include a power source 1222 coupled to the processor 1202, such as a disposable or rechargeable battery. The rechargeable battery may also be coupled to the peripheral device connection port to receive a charging current from a source external to the receiver device 1200.

Figure 13:
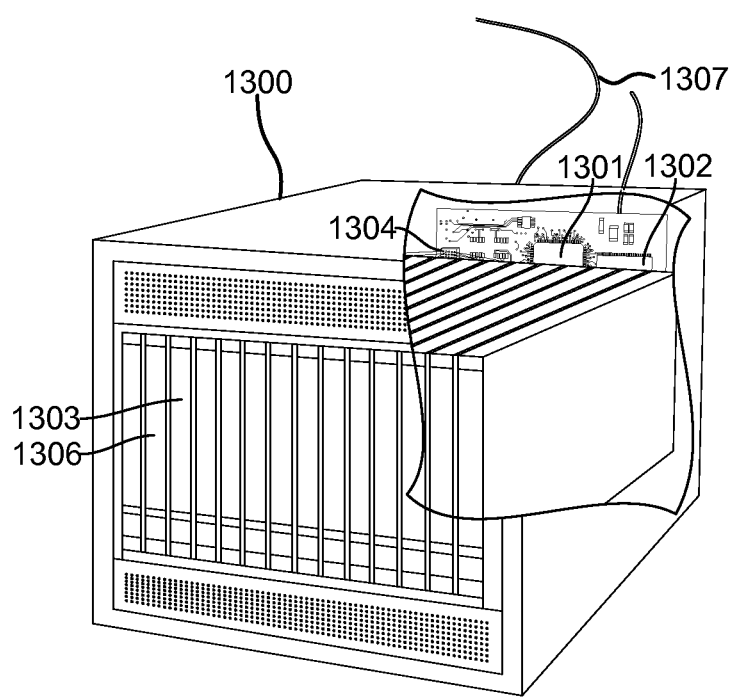
FIG. 13 is a component block diagram of an example server suitable for use with the various embodiments.

The various embodiments (including, but not limited to, embodiments discussed above with reference to FIGS. 7, 8, 9A, and 9B) may also be implemented on any of a variety of commercially available server devices, such as the server 1300 illustrated in FIG. 13. Such a server 1300 that implementing an embodiment typically includes a processor 1301 coupled to volatile memory 1302 and a large capacity non-volatile memory, such as a disk drive 1303. The server 1300 may also include a floppy disc drive, compact disc (CD) or DVD disc drive 1306 coupled to the processor 1301. The server 1300 may also include network access ports 1304 coupled to the processor 1301 for establishing network interface connections with a network 1307, such as a local area network coupled to other broadcast system computers and servers, the Internet, the public switched telephone network, and/or a cellular data network (e.g., CDMA, TDMA, GSM, PCS, 3G, 4G, LTE, and/or any other type of cellular data network).

The processors 1202 and 1301 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1202 and 1301. The processors 1202 and 1301 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1202 and 1301 including internal memory or removable memory plugged into the device and memory within the processor 1202 and 1301 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium, such as processor executable instructions. The steps of a method or algorithm disclosed herein may be embodied in a processor-executable software module which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for enabling Multimedia Broadcast Multicast Service ("MBMS") service continuity across two or more different public land mobile networks ("PLMNs") wherein one instance of the MBMS service is broadcast in each of the two or more different PLMNs, the method comprising:
   determining, by a processor of a receiver device, a current PLMN of the two or more different PLMNs to which the receiver device is attached, wherein the two or more different PLMNs have geographic coverage areas different than a home PLMN ("HPLMN") of the receiver device;
   receiving a user service description ("USD") for the MBMS service from the current PLMN at the processor of the receiver device, wherein receiving the USD from the current PLMN at the processor of the receiver device comprises downloading, by the processor of the receiver device, a provisioning URL from the current PLMN when the receiver device is attached to the current PLMN;
   selecting the MBMS service at the processor of the receiver device;
   determining a temporary mobile group identifier ("TMGI") for the MBMS service in the current PLMN at the processor of the receiver device; and
   activating the determined TMGI at the processor of the receiver device to receive the instance of the MBMS service broadcast in the current PLMN,
   wherein the USD indicates all TMGIs for all instances of the MBMS service broadcast in each of the two or more different PLMNs.

2. A method for enabling Multimedia Broadcast Multicast Service ("MBMS") service continuity across two or more different public land mobile networks ("PLMNs") wherein one instance of the MBMS service is broadcast in each of the two or more different PLMNs, the method comprising:
   determining, by a processor of a receiver device, a current PLMN of the two or more different PLMNs to which the receiver device is attached, wherein the two or more different PLMNs have geographic coverage areas different than a home PLMN ("HPLMN") of the receiver device;
receiving a user service description ("USD") for the MBMS service from the current PLMN at the processor of the receiver device, wherein receiving the USD from the current PLMN at the processor of the receiver device comprises downloading, by the processor of the receiver device, a provisioning URL from the current PLMN via Open Mobile Alliance device management ("OMA-DM"), short message service ("SMS"), domain name system ("DNS") look up, wireless access protocol ("WAP") push, or a public data network ("PDN") attachment procedure when the receiver device is attached to the current PLMN;
selecting the MBMS service at the processor of the receiver device;
determining a temporary mobile group identifier ("TMGI") for the MBMS service in the current PLMN at the processor of the receiver device; and
activating the determined TMGI at the processor of the receiver device to receive the instance of the MBMS service broadcast in the current PLMN.

3. A method for enabling Multimedia Broadcast Multicast Service ("MBMS") service continuity across two or more different public land mobile networks ("PLMNs") wherein one instance of the MBMS service is broadcast in each of the two or more different PLMNs, the method comprising:
determining, by a processor of a receiver device, a current PLMN of the two or more different PLMNs to which the receiver device is attached, wherein the two or more different PLMNs have geographic coverage areas different than a home PLMN ("HPLMN") of the receiver device;
receiving a user service description ("USD") for the MBMS service from the current PLMN at the processor of the receiver device, wherein session parameters for USD download are standardized across the two or more different PLMNs, and receiving the USD from the current PLMN at the processor of the receiver device comprises downloading, by the processor of the receiver device, the USD via an IP address and port number reserved by the two or more different PLMNs for USD use;
selecting the MBMS service at the processor of the receiver device;
determining a temporary mobile group identifier ("TMGI") for the MBMS service in the current PLMN at the processor of the receiver device; and
activating the determined TMGI at the processor of the receiver device to receive the instance of the MBMS service broadcast in the current PLMN.

4. The method of claim 1, further comprising:
receiving an encrypted MBMS key from a broadcast/multicast service center ("BM-SC") of the current PLMN at the processor of the receiver device, wherein the encrypted MBMS key was encrypted by the BM-SC of the current PLMN using information needed to protect a MBMS key for the receiver device sent to the BM-SC of the current PLMN from the HPLMN of the receiver device; and
decrypting the instance of the MBMS service broadcast in the current PLMN at the processor of the receiver device using the encrypted MBMS key received from the BM-SC of the current PLMN.

5. The method of claim 4, wherein the MBMS key is a MBMS service key ("MSK").

6. The method of claim 1, further comprising:
receiving a MBMS key for the receiver device at the processor of the receiver device from a broadcast/multicast service center ("BM-SC") of the current PLMN, wherein the MBMS key was received at the BM-SC of the current PLMN from the BM-SC of the HPLMN of the receiver device; and
decrypting the instance of the MBMS service broadcast in the current PLMN at the processor of the receiver device using the MBMS key from the BM-SC of the HPLMN of the receiver device.

7. The method of claim 6, wherein the MBMS key is a MBMS service key ("MSK").

8. A method for enabling Multimedia Broadcast Multicast Service ("MBMS") service continuity across two or more different public land mobile networks ("PLMNs"), the method comprising:
determining the MBMS service for the two or more different PLMNs is identical by a server, wherein the two or more different PLMNs have geographic coverage areas different than a home PLMN ("HPLMN") in a radio network shared by the two or more different PLMNs and the HPLMN; and
broadcasting one instance of the MBMS service in each of the two or more different PLMNs via the server in response to determining the MBMS service for the two or more different PLMNs is identical, wherein a user service description ("USD") for the MBMS service indicates all temporary mobile group identifiers ("TMGIs") for all instances of the MBMS service broadcast in each of the two or more different PLMNs.

9. The method of claim 8, wherein information needed to protect a MBMS key for decrypting the instance of the MBMS service is sent between broadcast/multicast service centers ("BM-SCs") of the two or more different PLMNs.

10. The method of claim 9, wherein the MBMS key is a MBMS service key ("MSK").

11. The method of claim 8, wherein a MBMS key for decrypting the instance of the MBMS service is sent between broadcast/multicast service centers ("BM-SCs") of the two or more different PLMNs.

12. The method of claim 11, wherein the MBMS key is a MBMS service key ("MSK").

13. A receiver device, comprising:
a transceiver; and
a processor coupled to the transceiver, the processor configured with processor executable instructions to perform operations comprising:
determining a current public land mobile network ("PLMN") of two or more different PLMNs to which the receiver device is attached, wherein one instance of an Multimedia Broadcast Multicast Service ("MBMS") service is broadcast in each of the two or more different PLMNs and the two or more different PLMNs have geographic coverage areas different than a home PLMN ("HPLMN") of the receiver device;
receiving a user service description ("USD") for the MBMS service from the current PLMN such that receiving the USD from the current PLMN comprises downloading a provisioning URL from the current PLMN when the receiver device is attached to the current PLMN;
selecting the MBMS service;
determining a temporary mobile group identifier ("TMGI") for the MBMS service in the current PLMN; and activating the determined TMGI to receive the instance of the MBMS service broadcast in the current PLMN, wherein the USD indicates all TMGIs for all instances of the MBMS service broadcast in each of the two or more different PLMNs.

14. A receiver device, comprising:
a transceiver; and
a processor coupled to the transceiver, the processor configured with processor executable instructions to perform operations comprising:
   determining a current public land mobile network ("PLMN") of two or more different PLMNs to which the receiver device is attached, wherein one instance of an Multimedia Broadcast Multicast Service ("MBMS") service is broadcast in each of the two or more different PLMNs and the two or more different PLMNs have geographic coverage areas different than a home PLMN ("HPLMN") of the receiver device;
   receiving a user service description ("USD") for the MBMS service from the current PLMN such that receiving the USD from the current PLMN comprises downloading a provisioning URL from the current PLMN via Open Mobile Alliance device management ("OMA-DM"), short message service ("SMS"), domain name system ("DNS") look up, wireless access protocol ("WAP") push, or a public data network ("PDN") attachment procedure when the receiver device is attached to the current PLMN;
   selecting the MBMS service;
   determining a temporary mobile group identifier ("TMGI") for the MBMS service in the current PLMN; and
   activating the determined TMGI to receive the instance of the MBMS service broadcast in the current PLMN.

15. A receiver device, comprising:
a transceiver; and
a processor coupled to the transceiver, the processor configured with processor executable instructions to perform operations comprising:
   determining a current public land mobile network ("PLMN") of two or more different PLMNs to which the receiver device is attached, wherein one instance of an Multimedia Broadcast Multicast Service ("MBMS") service is broadcast in each of the two or more different PLMNs and the two or more different PLMNs have geographic coverage areas different than a home PLMN ("HPLMN") of the receiver device;
   receiving a user service description ("USD") for the MBMS service from the current PLMN such that receiving the USD from the current PLMN such that session parameters for USD download are standardized across the two or more different PLMNs, and receiving the USD from the current PLMN comprises downloading the USD via an IP address and port number reserved by the two or more different PLMNs for USD use
   selecting the MBMS service;
   determining a temporary mobile group identifier ("TMGI") for the MBMS service in the current PLMN; and
   activating the determined TMGI to receive the instance of the MBMS service broadcast in the current PLMN.

16. The receiver device of claim 13, wherein the processor is configured with processor executable instructions to perform operations further comprising:
   receiving an encrypted MBMS key from a broadcast/multicast service center ("BM-SC") of the current PLMN, wherein the encrypted MBMS key was encrypted by the BM-SC of the current PLMN using information needed to protect a MBMS key for the receiver device sent to the BM-SC of the current PLMN from the HPLMN of the receiver device; and
   decrypting the instance of the MBMS service broadcast in the current PLMN using the encrypted MBMS key received from the BM-SC of the current PLMN.

17. The receiver device of claim 16, wherein the MBMS key is a MBMS service key ("MSK").

18. The receiver device of claim 13, wherein the processor is configured with processor executable instructions to perform operations further comprising:
   receiving a MBMS key for the receiver device from a broadcast/multicast service center ("BM-SC") of the current PLMN, wherein the MBMS key was received at the BM-SC of the current PLMN from the BM-SC of the HPLMN of the receiver device; and
   decrypting the instance of the MBMS service broadcast in the current PLMN using the MBMS key from the BM-SC of the HPLMN of the receiver device.

19. The receiver device of claim 18, wherein the MBMS key is a MBMS service key ("MSK").

20. A server, comprising:
a network access port; and
a processor coupled to the network access port, the processor configured with processor executable instructions to perform operations comprising:
   determining an Multimedia Broadcast Multicast Service ("MBMS") service for two or more different public land mobile networks ("PLMNs") is identical, wherein the two or more different PLMNs have geographic coverage areas different than a home PLMN ("HPLMN") in a radio network shared by the two or more different PLMNs and the HPLMN; and
   broadcasting one instance of the MBMS service in each of the two or more different PLMNs in response to determining the MBMS service for the two or more different PLMNs is identical, wherein a user service description ("USD") for the MBMS service indicates all temporary mobile group identifiers ("TMGIs") for all instances of the MBMS service broadcast in each of the two or more different PLMNs.

21. The server of claim 20, wherein information needed to protect a MBMS key for decrypting the instance of the MBMS service is sent between broadcast/multicast service centers ("BM-SCs") of the two or more different PLMNs.

22. The server of claim 20, wherein the MBMS key is a MBMS service key ("MSK").

23. The server of claim 20, wherein a MBMS key for decrypting the instance of the MBMS service is sent between broadcast/multicast service centers ("BM-SCs") of the two or more different PLMNs.

24. The server of claim 23, wherein the MBMS key is a MBMS service key ("MSK").

25. The method of claim 8, wherein the TMGI for all instances of the MBMS service broadcast in each of the two or more different PLMNs is the same.

26. The server of claim 20, wherein the processor is configured with processor executable instructions to perform operations such that the TMGI for all instances of the MBMS service broadcast in each of the two or more different PLMNs is the same.

* * * * *